United States Patent
Kusuma et al.

(10) Patent No.: US 6,183,678 B1
(45) Date of Patent: Feb. 6, 2001

(54) METHOD OF PROCESSING A MOLDED PLASTIC GLAZING PANEL

(75) Inventors: David Kusuma, Canton; Mark M. Matsco, South Lyon; Thomas Hovatter; Dimitris Katsamberis, both of Novi, all of MI (US)

(73) Assignee: Exatec, LLC., Wixom, MI (US)

(*) Notice: Under 35 U.S.C. 154(b), the term of this patent shall be extended for 0 days.

(21) Appl. No.: 09/277,888

(22) Filed: Mar. 29, 1999

(51) Int. Cl.[7] .................................................. B29C 45/00
(52) U.S. Cl. ...................... 264/138; 264/161; 264/328.1; 475/403.1; 475/806; 29/418
(58) Field of Search ..................... 264/138, 161, 264/1.1, 2.6, 2.7, 328.1; 425/403.1, 806; 29/418

(56) References Cited

U.S. PATENT DOCUMENTS 4,695,420 * 9/1987 Grawey et al. ...................... 264/265
5,401,453 * 3/1995 Moretz et al. ...................... 264/161
5,428,879 * 7/1995 Miller et al. ............................ 29/418

* cited by examiner

Primary Examiner—Jan H. Silbaugh
Assistant Examiner—Edmund H. Lee
(74) Attorney, Agent, or Firm—John R. Benefiel

(57) ABSTRACT

A method of handling molded plastic glazing panels during processing is disclosed, using one or more stabilizing handling tabs projecting outwardly from the perimeter of each panel, and which is molded at the same time as with the glazing panel itself is molded. Each tab has spaced apart bosses, each having through opening adapted to mate with pins projecting from a holder structure. Gussets may be molded into the bosses to control drip when the panel is coated with a liquid and to stiffen the bosses. The tabs enable stable positioning of the panel to avoid formation of optical flaws in the panels, and to facilitate compact vertical stacking of the panels during handling.

14 Claims, 8 Drawing Sheets

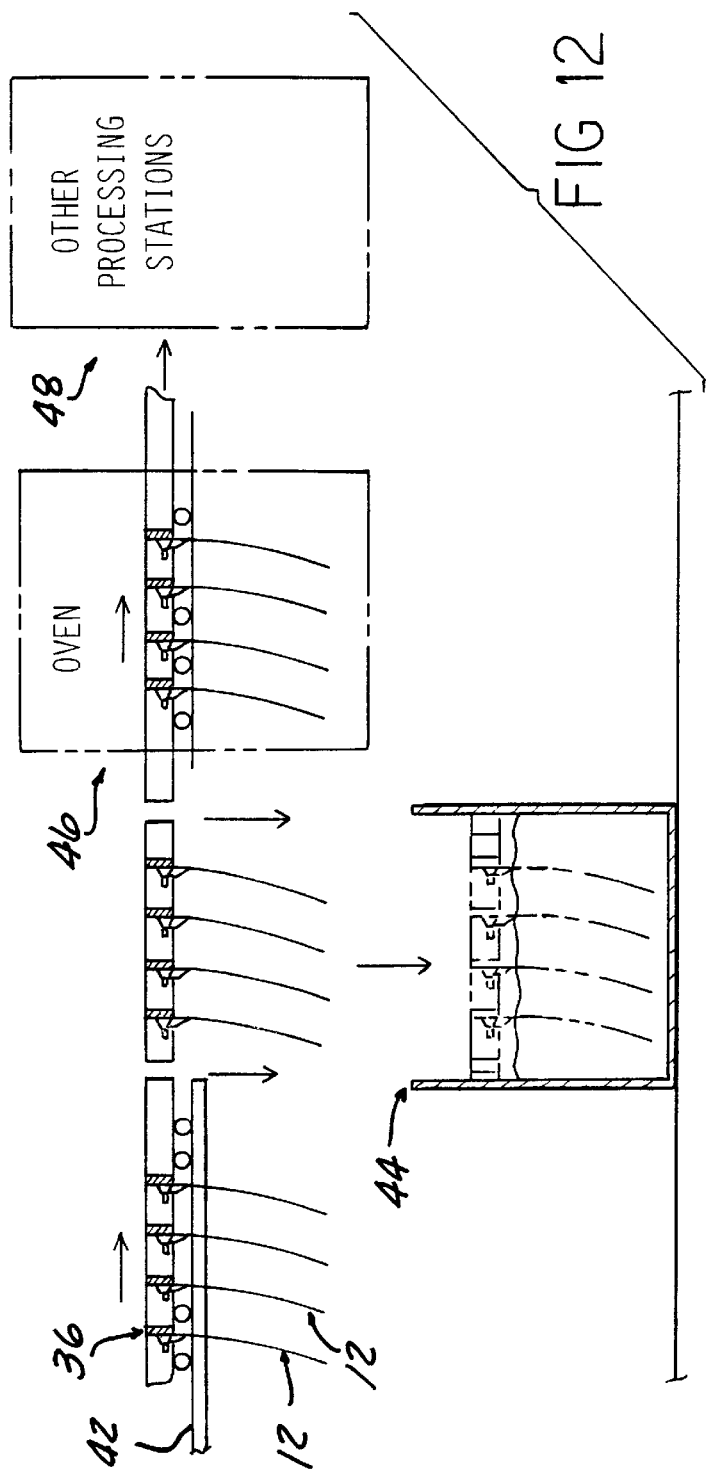
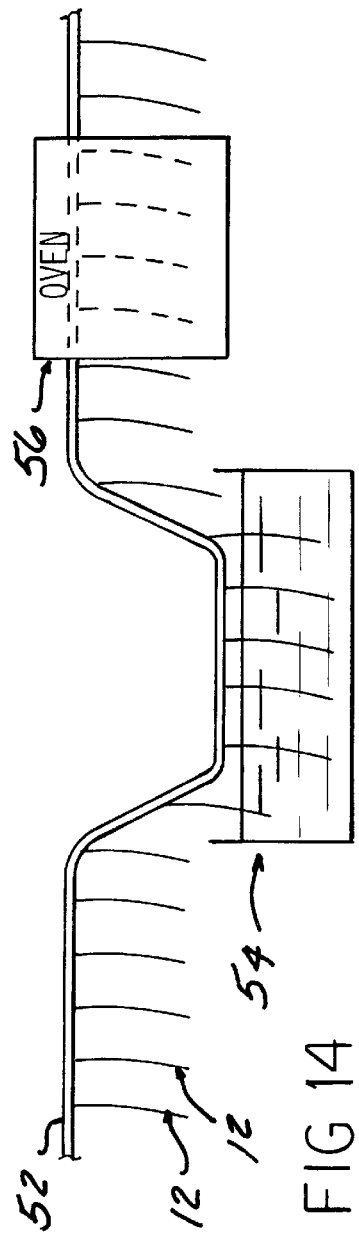

METHOD OF PROCESSING A MOLDED PLASTIC GLAZING PANEL

BACKGROUND OF THE INVENTION

This invention concerns manufacturing of molded plastic glazing panels, particularly curved glazing panels used in automotive vehicles.

The use of molded plastic glazing panels for the windows of automotive vehicles offers many advantages, such as reduced weight, superior resistance to fracture and/or dislodgment in the case of accidents, and greater freedom in vehicle styling due to the ease of forming glazing panels in any desired shape.

These advantages have not heretofore been realized on a large scale due to the difficulty in matching the optical clarity and scratch resistance of conventional glass panels. Such plastic panels must be resistant to obscuration due to UV radiation exposure, and must also block UV transmission to prevent deterioration of interior trim surfaces and fabric materials by UV radiation.

Polycarbonate has been widely proposed for this application, and the technology for hard coating this plastic has been developed which allows for the manufacture of UV and scratch resistant plastic glazing panels. This technology involves coating the panels, as by dipping the panels in tanks of liquid coating material and subsequent curing of the coating in an oven. Other coating processing steps have been developed as well for this application, such as a plasma coating.

In the automotive industry, any defect in a glazing panel which creates a visible optical flaw during the handling and processing would result in rejection of the part. Accordingly, handling and processing must be carried out in such a way as to minimize creating optical flaws.

The manufacture of automotive components is done on a vast scale in a very competitive environment, and thus, the processing of glazing panels must be carried out highly efficiently while still producing quality parts. There is a high probability of producing defective parts while handling the panels during dipping into a tank of liquid coating, as drips or the running of the liquid coating material onto the glazing may result in a visible flaw.

At the same time, the distinct curved shape of the glazing panels makes compact racking of the panels difficult. Any bumping of the panels as they are racked may also create scratches or other surface defects necessitating rejection of the part.

Accordingly, it is an object of the present invention to provide a method for handling of molded plastic glazing panels during processing steps which minimizes the incidence of optical flaws, yet allows large numbers of the panels to be efficiently handled during processing, and compactly stacked together in a vertical array.

SUMMARY OF THE INVENTION

The above object as well as others which will be understood upon a reading of the following specification and claims are achieved by a handling process in which one or more handling tabs are molded integrally with the transparent plastic glazing panel, projecting in an outward direction from the perimeter of the panel.

The tab or tabs each have a pair of side-by-side spaced apart engagement features engaged by mating features on a support structure so as to resist side-to-side and rotational movement of the panel. These engagement features may be comprised of a pair of bosses, each formed with a hole adapted to receive one of a pair of holder pins fixed to the support structure. The bosses may be stiffened with gussets extending towards the glazing panel, but blending into the tab short of the panel perimeter. The gussets promote controlled liquid run off to prevent puddling and dripping, and stiffen the bosses to resist front to rear movement of the panel.

As noted, the spaced apart bosses eliminate side to side rotation of the panel while the bosses and gussets provide stiffening structure able to resist front to rear movement of the panel. The tab enables holding the panel so as to resist any buoyancy induced tendency for movement of the panel during tank dipping, and allows the panel to be held in a tilted position for compact horizontal stacking of curved panels on racks, conveyors, hanger brackets, or supporting structure on other transfer devices used to handle the panels.

A raised ridge extending about each hole on the rear face of the tab minimizes the tendency of coating liquid to be retained between the rear tab face and an adjacent support surface against which the tab is abutted in hanging the panel.

The bosses have a generous draft taper to facilitate removal from the mold, and the holes are also similarly tapered. A series of inversely tapered ribs arranged about each hole interior may also be used to allow engagement with a constant diameter hanger pins.

The pins may also be tapered and formed with a larger diameter end, creating a step which serves to capture the tab once emplaced on the pins, preventing unintended movement off the pins as may result from vibrations or bumping of the support structure.

The tab engagement features may be configured identically for each glazing panel configuration such as to allow standardized fixturing and efficient use of automated handling equipment such as robots. That is, variations of the support structure can be used with a "universal" tab, or different tab configurations could be used on the same or different parts. A J-hook or bracket extension can be utilized to lower the position of the panel on the support structure.

At the conclusion of the panel processing, the tabs are trimmed off, with a slight step at the intersection of the tab and panel facilitating cut off.

DESCRIPTION OF THE DRAWING FIGURES

FIG. 12 is a diagram showing movement of a rack loaded with glazing panels through typical processing stations.

FIG. 14 is a diagram depicting continuous processing of glazing panels supported on a conveyor with an integral handling tab.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The present invention relates to handling of molded plastic glazing panels as manufacturing process steps are carried out on the panel. As examples of such steps, various coating and treating processes have been devised for improving the scratch resistance, UV transmission characteristics, weathering qualities, chemical solvent resistance, etc. of glazing panels molded from polycarbonate so as to realize the advantages of injection molded plastic automotive glazing. Other typical steps include inspection (automatic or manual), application of a black out border, oven curing of coatings, removal of runners, primer and adhesive seal application, etc. Whatever coating or treatment processes are practiced, efficient handling must be realized to enable such panels to be manufactured at reasonable cost.

A typical approach heretofore proposed is to first mold the glazing panels and then perform the coating and other treatments of the panels at a completely separate processing facility, perhaps at another plant.

This separate processing greatly increases manufacturing costs due to the extensive handling of the panels thereby entailed.

Other approaches might require very sophisticated and costly handling equipment to avoid creating optical flaws during processing.

Accordingly, the present invention provides a generally applicable method of handling such glazing panels during whatever particular process is being conducted on those glazing panels, which allows processing after molding of the panels at the same site as a part of an integrated manufacturing facility.

The transfer of the panels incidental to each processing step is contemplated as carried out by any of various transfer devices, such as conveyors allowing continuous or indexing movement of a series of panels, or by accumulating conveyors, etc. Transfer of individual panels by robot devices, or of groups of panels, as on racks may also be utilized, be used in conjunction with continuous or indexing conveyors, in which batch processing is used for certain process steps, and continuous transfer is used for other steps.

Figure 1:
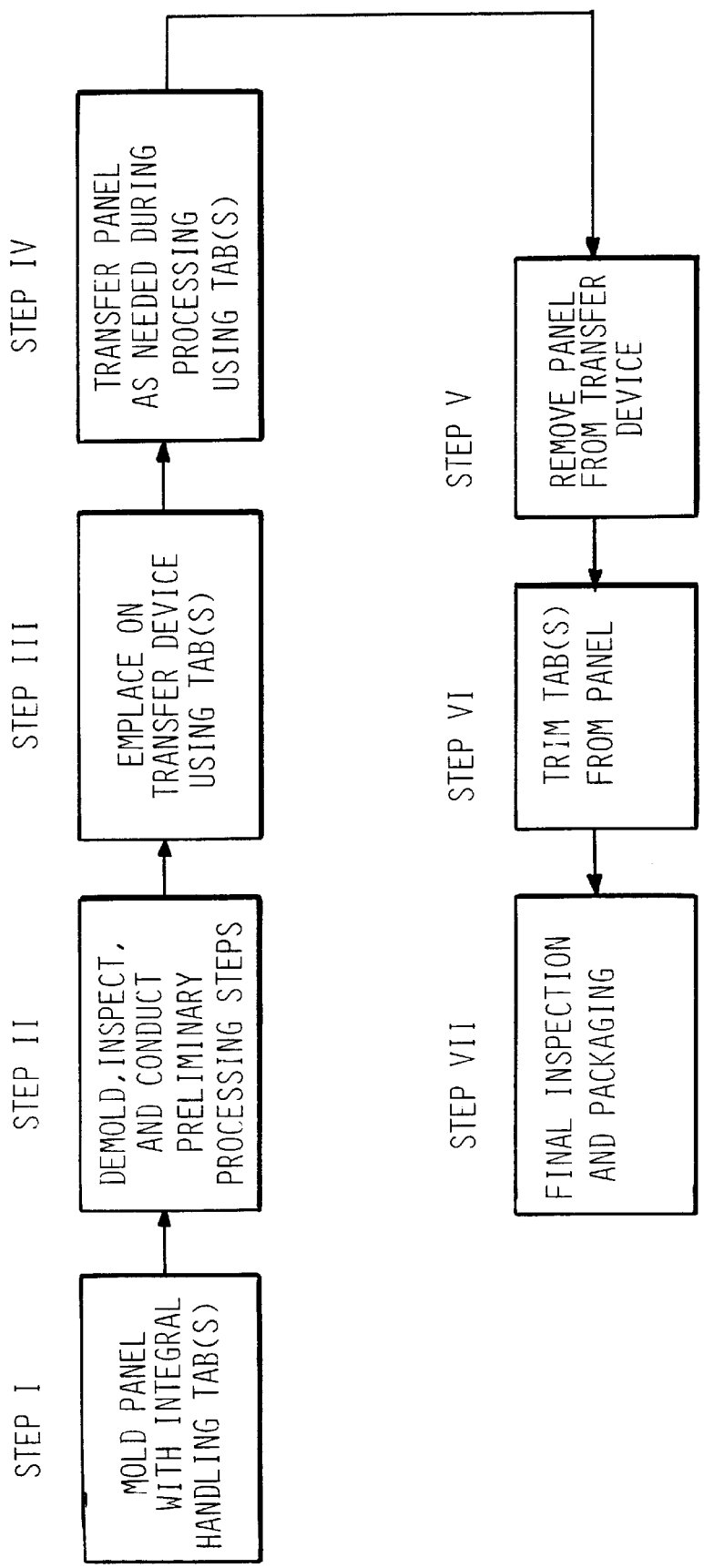
FIG. 1 is a block diagram of the handling process according to the present invention.

FIG. 1 is a block diagram representation of typical processing using the handling steps according to the present invention. This includes Step I, in which a glazing panel is injection molded from a transparent plastic, such as a polycarbonate or acrylic, so as to have one or more outwardly projecting handling tabs formed integrally therewith, the tab described in detail below.

In step II, the glazing panel is removed from the mold, inspected, and any preliminary processing is carried out such as cleaning and eliminating static charges.

In step III, the glazing panel is then emplaced on the holder structure of a transfer device, such as on a carrier rack, a conveyor hanger, robot gripper, etc. using the handling tabs as a connection to the holder structure.

In step IV, the glazing panel is transferred repeatedly, incidental to undergoing various subsequent processing steps, such as being dipped in a tank or disposed in a flow coating apparatus, and moved into and out of a curing oven. Such transfers are carried out using the engagement of a holder structure with the handling tabs.

Many other processes might be included, as for example plasma coating, application of black-out paint, etc.; and these all could involve handling of the panel using an engagement with one or more handling tabs. It will be understood by those skilled in the art that some of such processes typically will be carried out in clean room environments.

In step V, the panel is removed from the last transfer device holder structure, in step VI, the handling tab or tabs are trimmed from the panel, and in step VII, final inspection and packing are carried out.

Trim method utilized to remove the tab from the panel may be routing, laser cutting, water jet cutting, etc.

Figure 2:
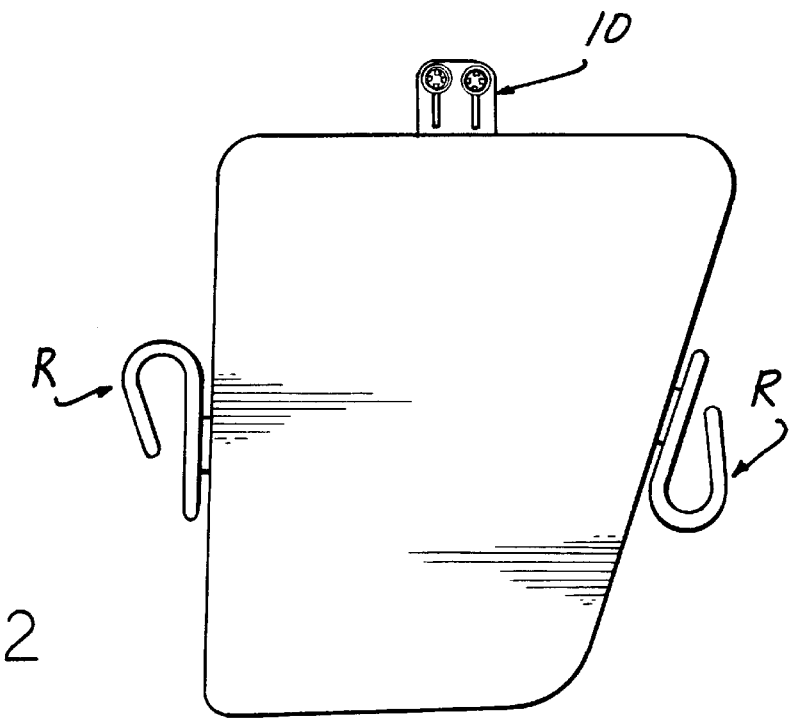
FIG. 2 is a front view of a glazing panel molded to have a stabilizing handling tab integral therewith.

Referring to FIG. 2, the stabilizing handling tab 10 is integrally formed with the glazing panel 12, extending generally outwardly from the perimeter thereof.

Runner plugs R are also shown, which would typically be trimmed after removal from the mold.

Figure 3:
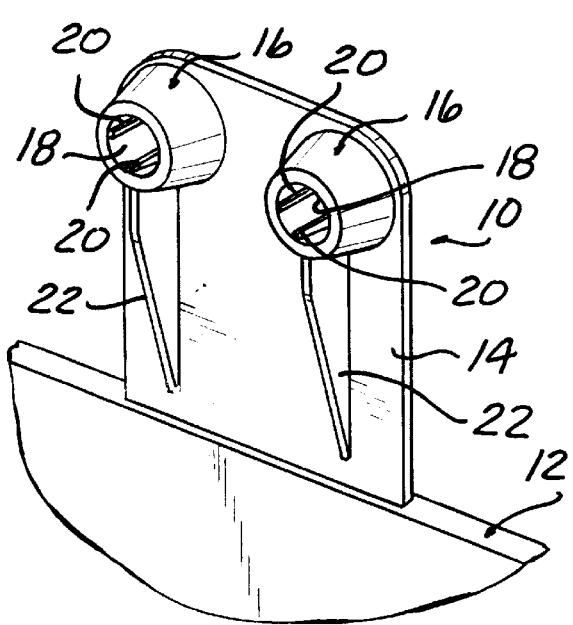
FIG. 3 is an enlarged fragmentary perspective view of a portion of the glazing panel shown in FIG. 2, showing details of the stabilizing handling tab.

The handling tab 10 includes a generally planar portion 14 (FIG. 3) which is preferably slightly thinner than the glazing panel 12 to create a step on one or both sides to facilitate later trimming of the tab 10 from the panel 12. A pair of laterally spaced apart features comprising tapered bosses 16 project from the planar portion 14. Each of the bosses 16 is formed with a through hole 18. The taper of the bosses 16 is to provide a draft angle for easier removal from the mold.

In order to allow snug engagement with a straight sided pin, a series of tapered ribs 20 may optionally be arranged about the interior of each hole 18.

A stiffener gusset 22 may extend from one side of each boss 16 towards the glazing panel 12 and blends into the planar portion 14 at a point short of the intersection between the tab 10 and the glazing panel 12. The gussets 22 stiffen the bosses 16, and create a controlled path for draining liquids to avoid drips onto the glazing panel 12.

Since the gussets 22 blend into the planar portion 14 short of the steps 24 they do not interfere with or otherwise make more difficult, the trimming operation described.

A holder structure 26 associated with a transfer device has pairs of pins 28, spaced apart and sized to be received in the holes 18, to thus allow the glazing panel 12 to be hung thereon.

The lateral spacing of the holes 18 establishes an antirotational structural resistance in the general plane of the glazing panel 12, while the bosses 16 and gussets 22 create stiffness to resist front to rear movement.

Figure 6:
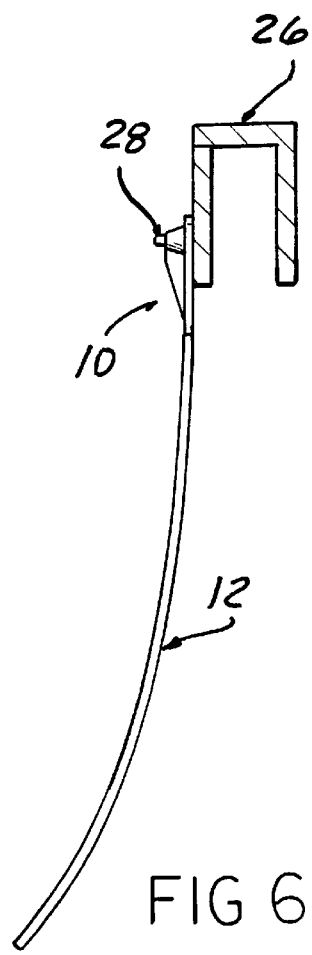
FIG. 6 is a side elevational view of a curved contour glazing panel emplaced on a holder structure in a tilted position.
Figure 4:
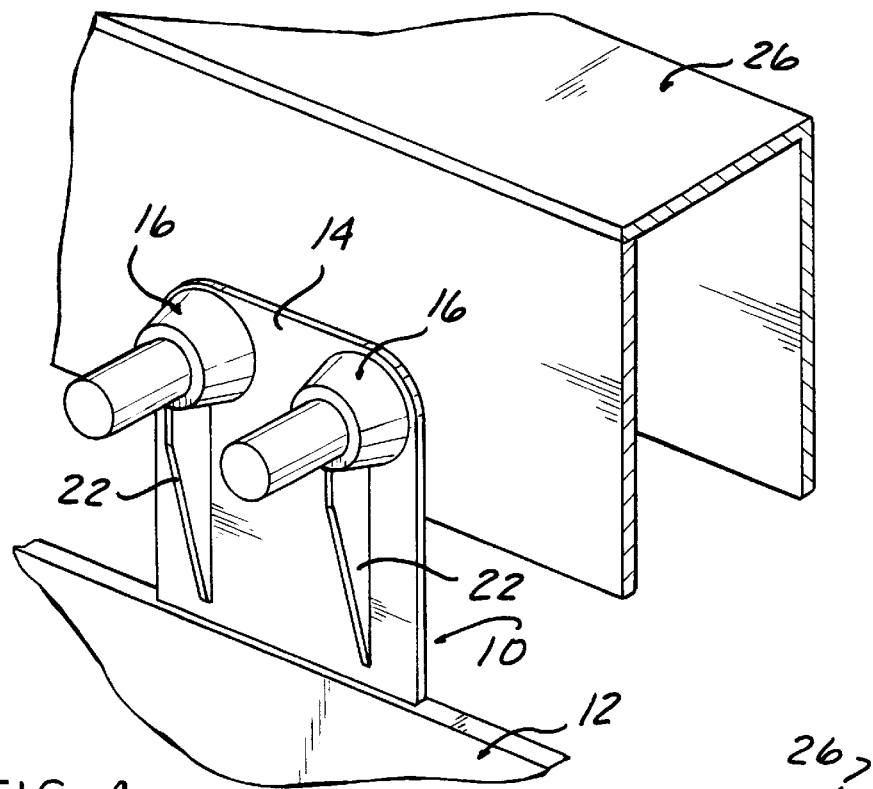
FIG. 4 is a fragmentary perspective view of a glazing panel and adjacent support structure on which the glazing panel is emplaced.

The tab structure resists any tendency to float due to the buoyancy of the panel when the glazing panel 12 is dipped in a liquid, and also allows tilting of the panels 10 to accommodate their curved shape when stacked horizontally for compactness as indicated in FIG. 6. The panels 12 can also be tilted when being loaded onto the rack due to the structural support provided by the holder tab 10.

A universal engagement feature configuration is contemplated as preferable for variously configured glazing panels 12, i.e., the same hole size and spacing will be used, so that an identical holder structure can be used for a variety of glazing panels being handled. For example, a pin diameter of 0.5 inches and spacing of 1.5 inches could be used for typical auto window panels.

Figure 7:
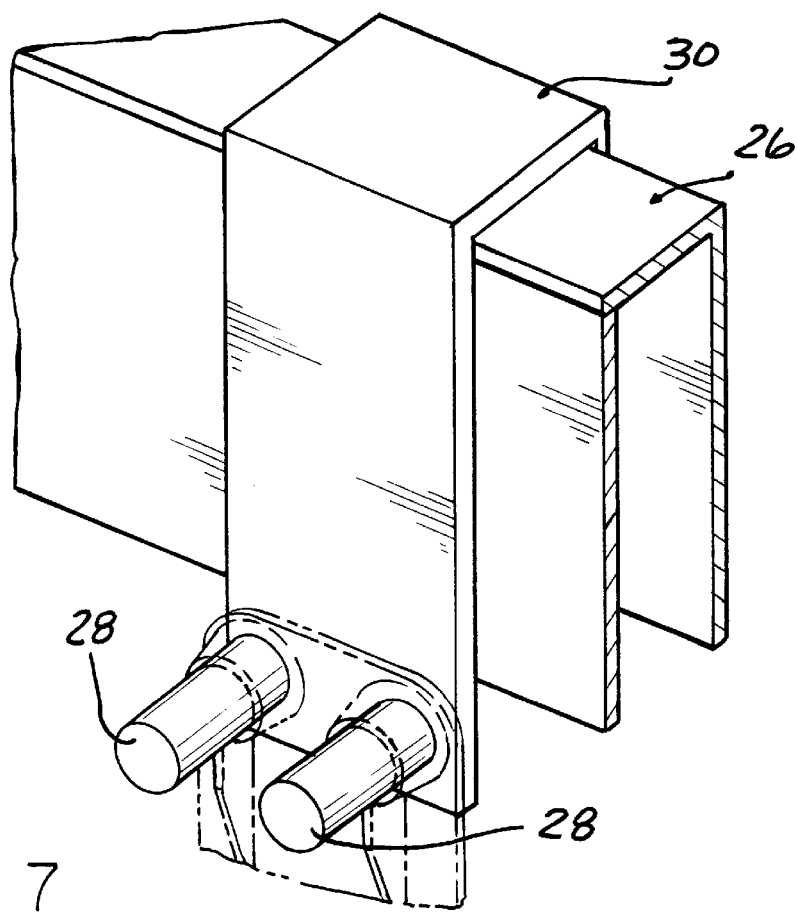
FIG. 7 is a perspective fragmentary view of a portion of the glazing panel relocated on a rack by a J-hook.

A J-hook extension 28 (FIG. 7) can be utilized to position the panel lower with respect to the support structure, if required.

Figure 8:
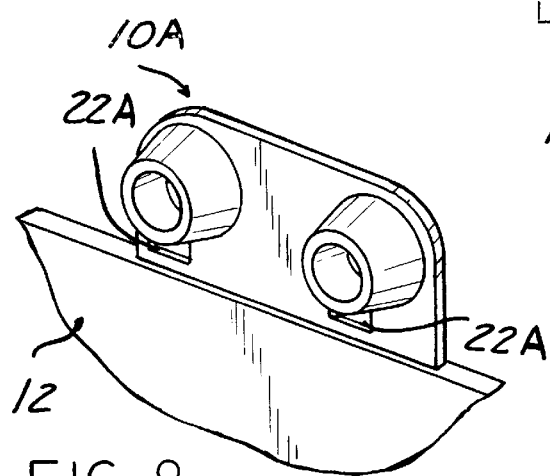
FIG. 8 is a perspective fragmentary view of a glazing panel with an alternate form of handling tab.

The remaining tab structure can be varied, as shown in FIG. 8, where the tab 10A is shortened and has smaller gussets 22A. The gussets 22 or 22A could be entirely eliminated in many applications.

Figure 5:
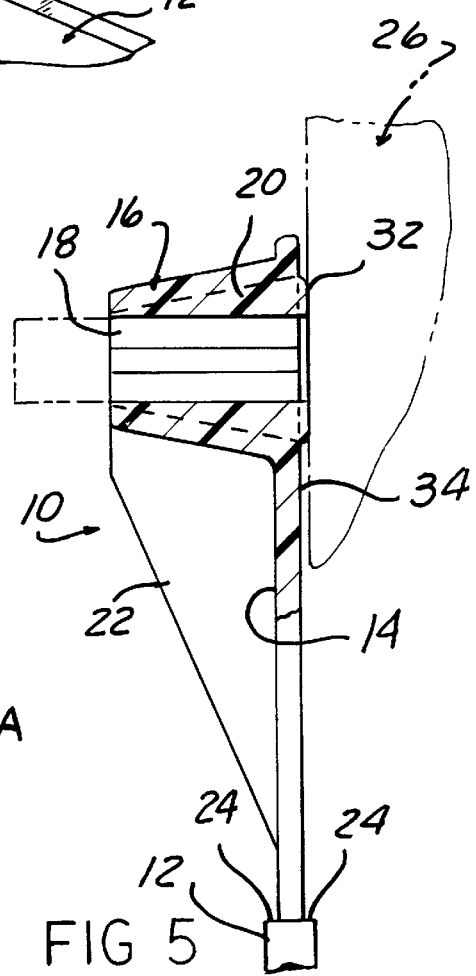
FIG. 5 is an enlarged fragmentary section view of the glazing panel of FIG. 2, showing further details of the handling tab.

A raised ridge 32 (FIG. 5) is preferably formed about the holes 18 at the rear face 34 of the tab 10. This will minimize the tendency to trap liquid between the tab 10 and the adjacent surface of the holder structure 26 due to surface tension and capillary action.

Figure 9:
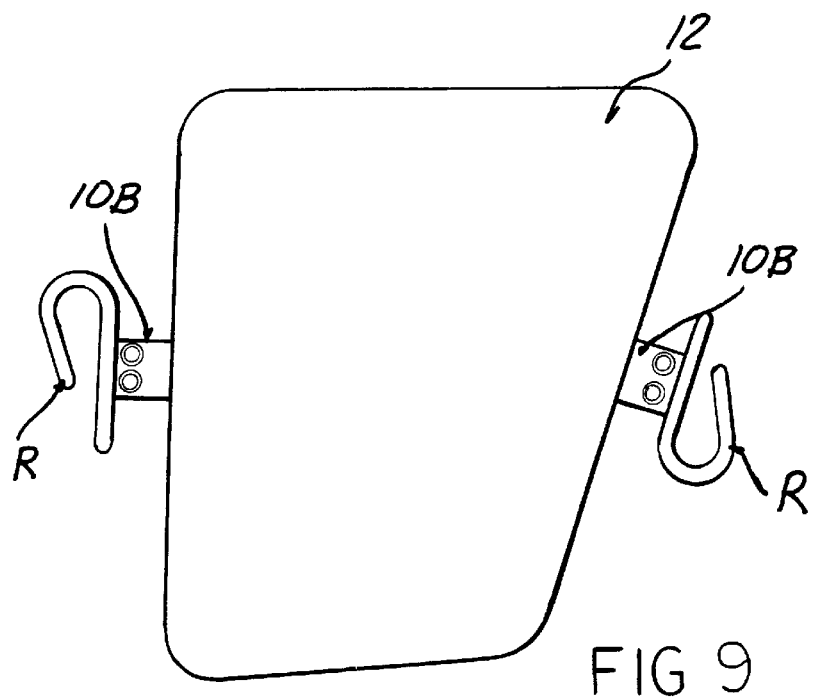
FIG. 9 is a front view of a glazing panel having two handling tabs formed integrally with the runner plugs.

More than one tab can be provided, and a pair of tabs 10B can be formed aligned with the runners R (FIG. 9). This arrangement simplifies the trimming operations, as the tabs 10 can be trimmed at the same time as the runners R.

Figure 10:
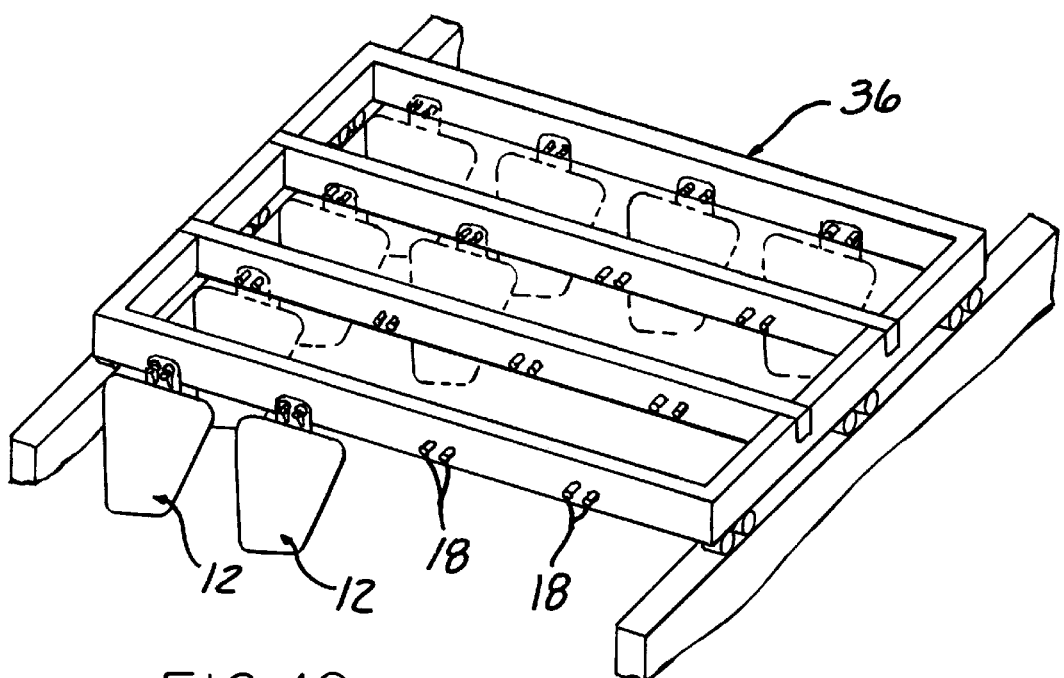
FIG. 10 is a perspective view of a holder rack loaded with glazing panels supported thereon by handling tabs.

FIG. 10 shows a rack 36 used as the transfer device, having a series of cross members 38 with a series of pairs of projecting pins 18 located to allow emplacement of the tabs 10 thereon.

Figure 11:
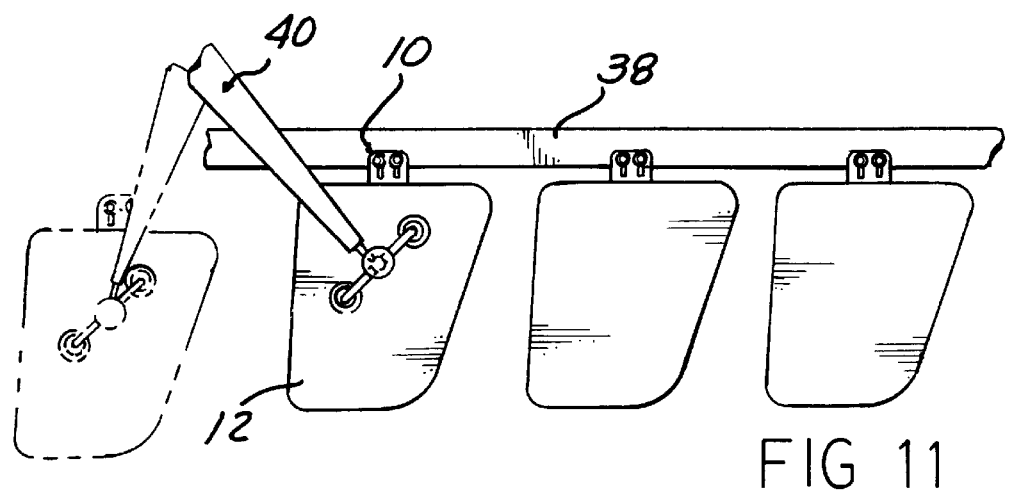
FIG. 11 is a front view of a rack span depicting loading of glazing panels thereon with a robot arm.

A robot arm 40 (FIG. 11) can be used to emplace each panel 12 on the cross members 38. The rack 36 may have rollers as shown to allow movement along a track 42 as to a dip station 44 (FIG. 12), oven 46, and other processing station 48.

Figure 13:
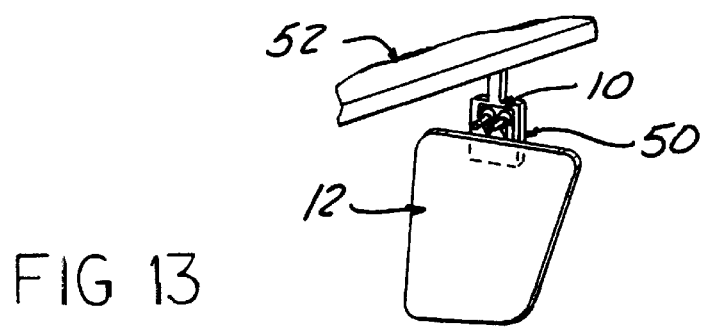
FIG. 13 is a perspective view of a glazing panel loaded onto a conveyor using the stabilizing handling tabs for continuous processing.

Continuous production is preferred for automotive applications, although batch processing could be combined with continuous movement, using accumulator conveyors. The panels 12 may thus be emplaced on a conveyor used as a transfer device, the conveyor having hangers 50 (FIG. 13). The conveyor 52 would move a continuous series of glazing panels 12 through the processing stations 54, 56 as indicated in FIG. 14.

Figure 15:
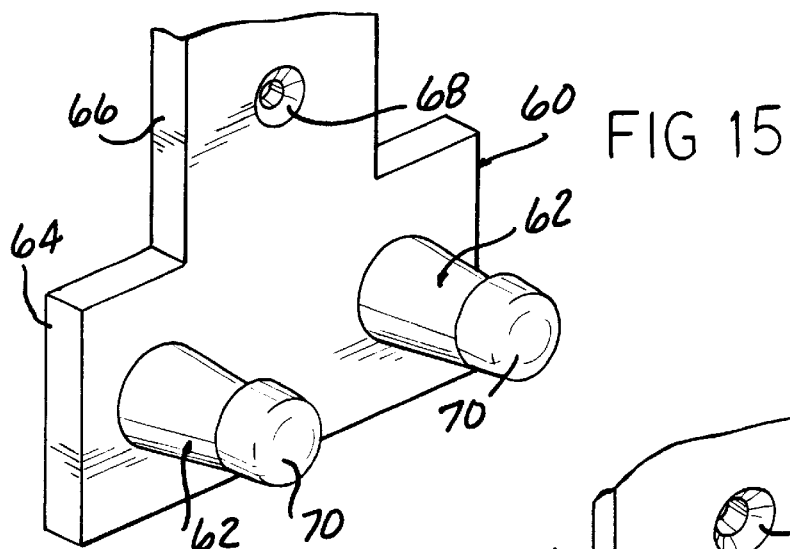
FIG. 15 is a perspective view of an alternate form of a bracket and support pins for engaging the handling tab according to the invention.
Figure 16:
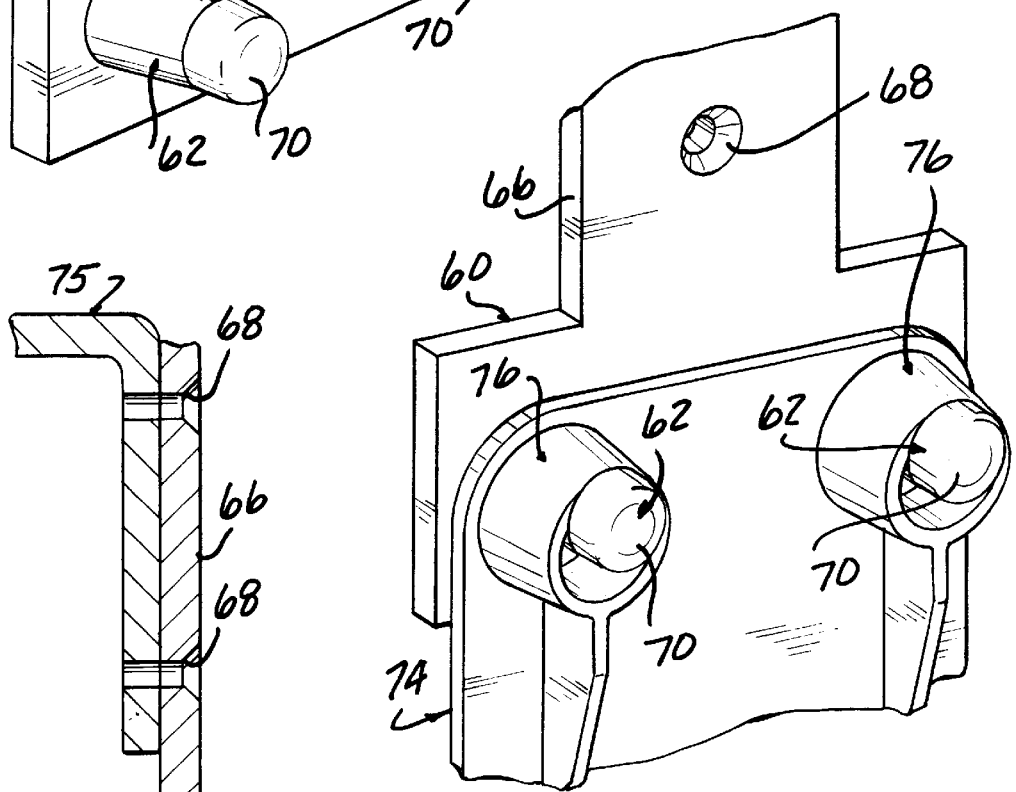
FIG. 16 is a fragmentary perspective view of a handling tab supported on the bracket shown in FIG. 15.
Figure 17:
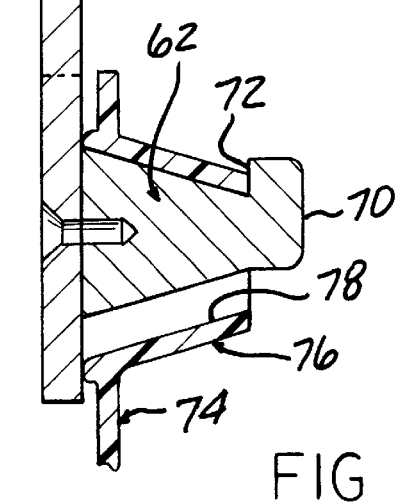
FIG. 17 is a sectional view of the handling tab and bracket shown in FIG. 16.

An alternate form of a hanger bracket 60 is shown in FIGS. 15–17. This includes a pair of laterally spaced tapered pins 62 projecting from a base plate 64 which can include an upwardly extending portion 66 having attachment holes 68 for attachment to a holder structure 76. The pins 62 each have an enlarged cylindrical end 70 which creates a step 72 on the upper surface thereof. The tab 74 has a pair of bosses 76 formed with tapered openings 78 sized to receive the pins 62. The height of the bosses 76 is slightly less than the distance from boss of the pins 62 to the step 72 so that upon placing the tab 74 on the pins 62, the tab is captured by the step 72 to prevent the panels from shifting off the pins 62 due to shocks or vibrations as the transfer of the panel is being carried out.

Figure 18:
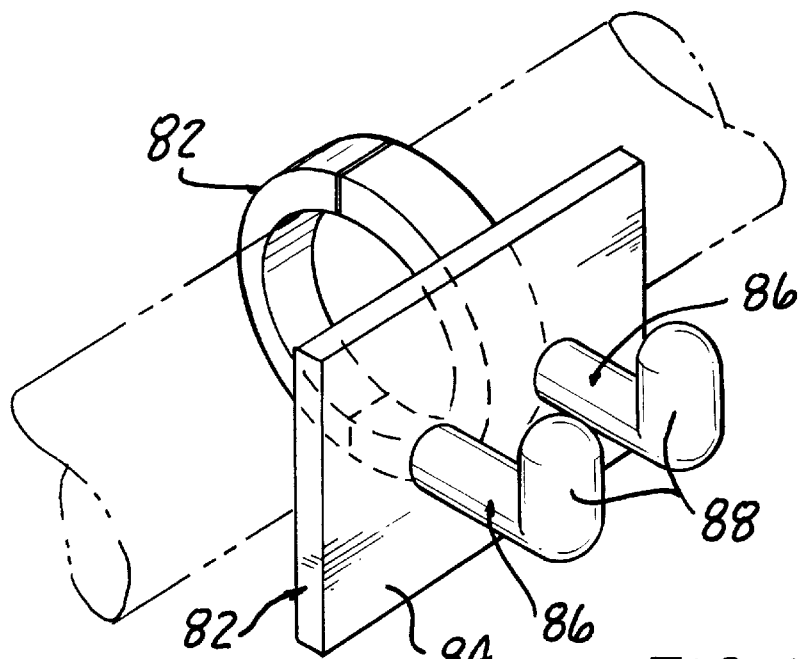
FIG. 18 is a perspective view of another form of bracket shown installed on a support bar shown in phantom lines.
Figure 19:
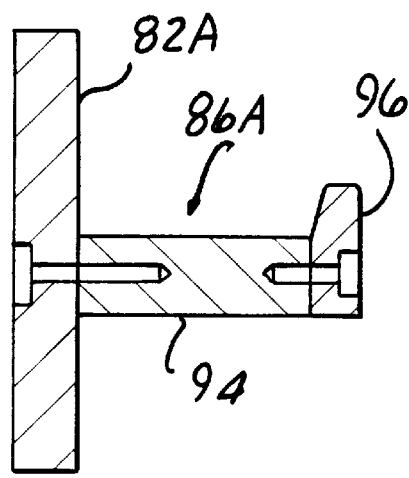
FIG. 19 is a sectional view of another construction of the bracket shown in FIG. 18.
Figure 20:
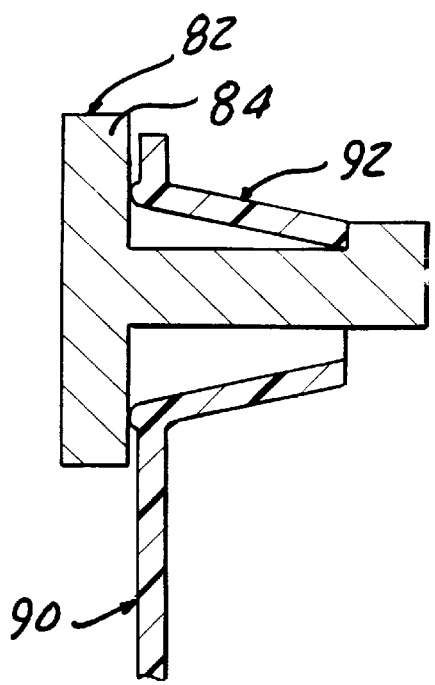
FIG. 20 is a sectional view of a handling tab installed on a bracket of a type shown in FIG. 19.

FIGS. 18–20 show other variations in the bracket. FIG. 18 shows a bracket 80 having a split clamping ring 82 welded to the rear of the base plate 84, used to clamp the bracket to a pipe support.

A pair of pins 86 having angled tips 88 create a hooking action with bosses 92 to retain a tab 90 (FIG. 20). The tips 88 may be coated with vinyl of other plastic if compatible with the coating or other processing.

The pins 86A may be constructed of separate attached parts 94, 96 as shown in FIG. 19.

Accordingly, it will be appreciated that the handling process utilizing an integrally formed tab allows efficient manufacture of molded plastic glazing panels having optically clear regions with minimal incidence of flaws, to be suited to efficient large scale manufacturing of such panels.

What is claimed is:

1. A method of processing a molded plastic glazing panel comprising the steps of:

molding at least one integral handling portion projecting in an outward direction from said glazing panel;

configuring said handling portion to be interfit to a portion of a holder structure of a transfer device so as to stabilize said glazing panel position on said holder structure;

transferring said glazing panel through one or more processing sites whereat one or more operations are performed on said glazing panel using engagement of said handling portion with holder structure on one or more transfer devices; and thereafter removing said at least one handling portion from said glazing panel.

2. The method according to claim 1 wherein in said molding step, said at least one handling portion is configured as a generally planar tab portion projecting away from a perimeter of said glazing panel.

3. The method according to claim 2 wherein in said molding step, said tab portion is configured with at least two spaced apart engagement features interfit to corresponding engagement features on said holder structure to thereby stabilize said glazing panel against movement in a plane in which said features lie.

4. The method according to claim 3 wherein in said molding step, a pair of spaced apart openings are formed into said generally planar tab portion, said openings configured to receive a pair of pins on said holder structure to thereby stabilize said glazing panel against movement.

5. The method according to claim 4 further including the step of molding a pair of bosses projecting from one side of said generally planar tab portion, said openings extending through said bosses.

6. The method according to claim 5 further including the step of molding a pair of gussets, each blending into a respective one of said bosses and into said tab planar portion.

7. The method according to claim 6 wherein said pair of gussets are molded so as to blend into said tab planar portions to be spaced a substantial distance from said panel perimeter.

8. The method according to claim 3 including the step of molding said tab generally planar portion to be thinner than said glazing panel to define a shoulder facilitating trimming of said tab from said glazing panel.

9. The method according to claim 6 wherein said bosses are molded with draft angles to facilitate demolding.

10. The method according to claim 4 wherein a raised area is molded around said openings on one side of said tab planar portion to resist retention of liquid trapped between said tab planar portion and a support surface against which said side is abutted.

11. The method according to claim 3 wherein a plurality of differently configured glazing panels are processed, and wherein identically spaced features are molded into a tab portion on each glazing panel configuration, whereby said holder structure may be utilized with differently configured glazing panels.

12. The method according to claim 9 wherein said opening extending through each boss is molded to be tapering, and wherein a series of inversely tapering ribs are molded to extend along said opening to enable receiving straight sided pins.

13. The method according to claim 4 wherein in said molding step, said tab portion is molded to be connected to a runner plug, and wherein both said tab and runner plug are trimmed in one step.

14. The method according to claim 13 wherein in said molding step, a pair of tabs are formed with said glazing panel, each integrally formed with a runner plug.

* * * * *